(12) United States Patent
Ikeda et al.

(10) Patent No.: US 8,150,300 B2
(45) Date of Patent: Apr. 3, 2012

(54) METHOD FOR MANUFACTURING MOLD AND BLADE FOR ELECTROPHOTOGRAPHIC APPARATUS, AND DEVELOPER AMOUNT CONTROLLING BLADE

(75) Inventors: Takako Ikeda, Ushiku (JP); Kazuaki Iwata, Toride (JP); Naohiko Nakano, Ryugasaki (JP)

(73) Assignee: Canon Kasei Kabushiki Kaisha, Tsukuba-shi (JP)

( * ) Notice: Subject to any disclaimer, the term of this patent is extended or adjusted under 35 U.S.C. 154(b) by 845 days.

(21) Appl. No.: 12/141,261

(22) Filed: Jun. 18, 2008

(65) Prior Publication Data

US 2009/0014912 A1 Jan. 15, 2009

(30) Foreign Application Priority Data

Jul. 9, 2007 (JP) .................. 2007-179637

(51) Int. Cl.
*G03G 15/09* (2006.01)
*B28B 7/36* (2006.01)
(52) U.S. Cl. ...................... 399/274; 264/338
(58) Field of Classification Search .......... 399/260, 399/274, 284; 264/264, 236, 310, 331.13, 264/338
See application file for complete search history.

(56) References Cited

U.S. PATENT DOCUMENTS

| | | | |
|---|---|---|---|
| 6,703,472 B2 | 3/2004 | Miura et al. | |
| 7,662,329 B2 | 2/2010 | Tomiyama et al. | |
| 2003/0231908 A1 | 12/2003 | Tomiyama et al. | |
| 2005/0111885 A1* | 5/2005 | Ishigaki | 399/279 |
| 2005/0226661 A1* | 10/2005 | Ohmura et al. | 399/333 |
| 2008/0213421 A1 | 9/2008 | Tomiyama et al. | |

FOREIGN PATENT DOCUMENTS

| | | |
|---|---|---|
| CN | 1456427 A | 11/2003 |
| JP | 2001-305858 A | 11/2001 |
| JP | 2003-231142 A | 8/2003 |
| JP | 2007033970 A * | 2/2007 |

OTHER PUBLICATIONS

Machine Translation of JP 2003-231142 A obtained on Mar. 2, 2011.*
Machine Translation of JP 2007-033970A obtained on Sep. 9, 2011.*

* cited by examiner

*Primary Examiner* — David Gray
*Assistant Examiner* — Gregory H Curran
(74) *Attorney, Agent, or Firm* — Fitzpatrick, Cella, Harper & Scinto (57) ABSTRACT

A mold for use in producing a molded body of an elastomer has a holding layer and a releasing layer on an inner periphery surface of a main body of a die. The releasing layer is formed of an addition two-component liquid silicone having a polysilazane-based or polysiloxane-based chain as a main chain, contains 0.5 mass % or less of a component which volatilizes at a curing temperature of a liquid elastomer raw material, does not contain silica, has International Rubber Hardness Degree of 50 to 85 degrees, and contains a solid lubricant having an average particle size of 2 to 20 μm. The present invention also provides a method for manufacturing a blade for an electrophotographic apparatus by using the mold and a developer amount controlling blade having specific load length ratio and ten-point average roughness in which a blade member is manufactured with the method.

7 Claims, 4 Drawing Sheets

METHOD FOR MANUFACTURING MOLD AND BLADE FOR ELECTROPHOTOGRAPHIC APPARATUS, AND DEVELOPER AMOUNT CONTROLLING BLADE

BACKGROUND OF THE INVENTION

1. Field of the Invention

The present invention relates to a blade for an electrophotographic apparatus which is an image forming apparatus using an electrophotographic process such as an electrophotographic copier, a laser beam printer and a facsimile, and to a developer amount controlling blade. The present invention also relates to a mold which can be used for molding the blade for the electrophotographic apparatus.

2. Description of the Related Art

Generally, an electrophotographic apparatus uses a cleaning blade for removing toner remaining on a photosensitive member after the photosensitive member has transferred an image onto a recording paper, and a developer amount controlling blade so as to form a thin layer while triboelectrically charging a developer in a development apparatus and the like.

Such a blade for an electrophotographic apparatus is generally formed of a rubber sheet, a metallic thin sheet, a resin sheet and a laminate of them. The cleaning blade is made of a blade member which abuts on the photosensitive member and a supporting member for supporting the blade member into a predetermined position. The developer amount controlling blade is made of a blade member which is pressure-welded with a developer bearing member and the supporting member for supporting the blade member into the predetermined position. A surface which is pressure-welded with the developer bearing member of the blade member has a function of controlling a friction charge of the developer, and accordingly is referred to as a charge-controlling surface. A surface layer of the charge-controlling surface can be referred to as a charge-controlling layer.

Such a blade member used as the electrophotographic apparatus employs, for instance, a plate material such as a urethane resin, a polyamide elastomer or a silicone rubber. In particular, blade members of the cleaning blade and the developer amount controlling blade are required to have a high accuracy of a dimension; and furthermore both of the blade members often use a highly abrasion-resistant material and use a polyurethane resin in many cases, because of performing the function when sliding on a rotating member.

In recent years, an electrophotographic process has a trend of forming an image of higher quality at a higher speed, and both a cleaning blade and a developer amount controlling blade are required to show higher performance. In particular, the developer amount controlling blade is required to make a developer thinly and uniformly carried on the surface of a developer bearing member in a state that the developer has a uniform charged amount, it is known that surface properties of a blade member greatly affect on a transportation force and the charged amount of the developer.

Conventionally, it has been thought that the smoother the charge-controlling surface of the developer amount controlling blade is made, the more uniform the developer particles are charged and transported. However, as a result of having recently studied an effect of the flatness of the charge-controlling surface on a uniform charge and transportation of the developer in detail, it was found that it was rather better to roughen the developer-controlling surface to some extent, in order to uniformly electrify and transport the developer. Accordingly, the surface of the blade member can be stably roughened.

In the case of the cleaning blade as well, the blade member is required to have a dimension of high accuracy, because the blade member must completely remove a developer remaining on a photosensitive member, which has recently a small diameter. It is also important for the cleaning blade to have an edge face with precise surface roughness (edge accuracy), which contacts the photosensitive member. When the surface roughness accuracy is 10 μm or more, the cleaning blade causes poor cleaning and occasionally results in causing a line on a recording paper. For this reason, the surface properties of a part contacting a die surface also become important.

In order to stably and inexpensively produce a blade of higher accuracy for an electrophotographic apparatus, with respect to such an accuracy of a dimension and surface properties, a mold is important. A mold is expected which can maintain adequate peelability and demolding properties for a long period of time when repeatedly molding the blade, in order to inexpensively manufacture the blade for the electrophotographic apparatus having superior dimensional accuracy and surface properties.

Japanese Patent Application Laid-Open No. 2001-305858 describes a manufacturing method which has a superior thickness accuracy, does not need to subject a die to an accurate working and does not need to clean a sheet after having molded the sheet. A technology disclosed in Japanese Patent Application Laid-Open No. 2001-305858 includes pouring a solventless two-component liquid silicone rubber into the inside of a die having a cylindrical shape by using a centrifuge molding method to form a molded body of the silicone rubber, and then pouring a material of the blade for the electrophotographic apparatus therein to cure the material. Hereby, the technology is assumed to show an effect of controlling the thickness accuracy to 0.1 mm or less. However, the method may cause problems of making the silicone rubber deformed, torn and hardly demolded due to the volatilization of a volatile component, when the molding and demolding operation is repeated for a long period of time.

Japanese Patent Application Laid-Open No. 2003-231142 proposes a method of forming a releasing layer which is made from a resin having a polysilazane-based or polysiloxane-based chain as a main chain, and has a hardness in a range of 55 to 85 degrees by a JISA type, in the inside of a die, as a method which can maintain mold-releasability for a long period of time without cleaning a release agent after molding. However, the method occasionally has a problem in stability after the reaction. While the die is used for molding for a long period of time, a chemical reaction occurs between the materials of the surface of the releasing layer and of a blade member, which may make the releasing layer hardly maintain mold-releasability. Silica which remains in silicone rubber as a reactive group even after the silicone rubber has been cured by a reaction reacts with the material of the blade member, and may make the releasing layer not maintain adequate mold-releasability for a long period of time.

SUMMARY OF THE INVENTION

Specifically, a mold which can maintain adequate peelability and demolding properties for a long period of time is required so as to manufacture a blade member of higher accuracy for an electrophotography with respect to the accuracy of a dimension and surface properties.

An object of the present invention is to provide a mold for use in producing a molded body of an elastomer, which can maintain adequate peelability and demolding properties for a long period of time.

Another object of the present invention is to provide a method of manufacturing a blade for the electrophotographic apparatus, which can impart a higher accuracy of a dimension and more highly accurate surface properties to a blade member.

Further another object of the present invention is to provide a developer amount controlling blade which has the blade member with the higher accuracy of the dimension and the more highly accurate surface properties and can contribute to a manufacture of a high quality image.

The present invention provides a mold which has a holding layer formed on an inner periphery surface of a main body of a die and a releasing layer formed on an inner periphery surface of the holding layer, and is used when a molded body of an elastomer is produced by charging a liquid elastomer raw material into the inside of the mold and curing it, wherein (a) the releasing layer is formed of an addition two-component liquid silicone having a polysilazane-based or polysiloxane-based chain as a main chain; (b) the releasing layer contains 0.5% mass or less of a component which volatilizes at a curing temperature of the liquid elastomer raw material; and (c) the releasing layer contains 1% mass or less of silica ($SiO_2$).

The present invention provides a method for manufacturing a blade for an electrophotographic apparatus, which has a blade member and a supporting member for supporting the blade member, wherein the blade member is manufactured through the steps of: (1) charging a liquid elastomer raw material into the mold; and (2) curing the raw material in the mold to form a cured molding body.

The present invention provides a developer amount controlling blade for an electrophotographic apparatus, which has a blade member that is used in a state of being abutted by a developer bearing member, and a supporting member for supporting the blade member, wherein the blade member is manufactured by the above described manufacturing method; when a load length ratio at least at a part used in a state of being abutted by the developer bearing member of the blade member is defined as Tp(C) (here, C is a cutting level (%)), Tp (50%) is 30 or more and 90 or less; and ten-point average roughness (Rz) at least at a part used in a state of being abutted by the developer bearing member of the blade member is 2 μm or larger and 25 μm or smaller.

The present invention provides a mold for use in manufacturing a molded body of an elastomer, which can maintain adequate peelability and demolding properties for a long period of time.

The present invention provides a method for manufacturing a blade member for an electrophotographic apparatus, which can impart a higher accuracy of a dimension and more highly accurate surface properties to the blade member.

The present invention provides a developer amount controlling blade which has the blade member with the higher accuracy of the dimension and the more highly accurate surface properties and can contribute to a manufacture of a high quality image.

Further features of the present invention will become apparent from the following description of exemplary embodiments with reference to the attached drawings.

DESCRIPTION OF THE EMBODIMENTS

Embodiments of the present invention will now be described in detail, but the present invention is not limited to the embodiments.

The present invention is a mold having a holding layer formed on an inner periphery surface of a main body of a die and a releasing layer formed on an inner periphery surface of the holding layer, and is used for manufacturing a molded body of an elastomer through charging a liquid elastomer raw material into the inside of the mold and curing it. The above releasing layer of the mold satisfies the following requirements (a) to (e):

(a) the releasing layer is formed of an addition two-component liquid silicone having a polysilazane-based or polysiloxane-based chain as a main chain;

(b) the releasing layer contains 0.5% mass or less of a component which volatilizes at a curing temperature of the liquid elastomer raw material;

(c) the releasing layer contains 1% mass or less silica ($SiO_2$);

(d) the releasing layer has a hardness of 50 degrees or more and 85 degrees or less by International Rubber Hardness Degree; and (e) the releasing layer contains a solid lubricant having an average particle size of 2 μm or larger and 20 μm or smaller.

Figure 1:
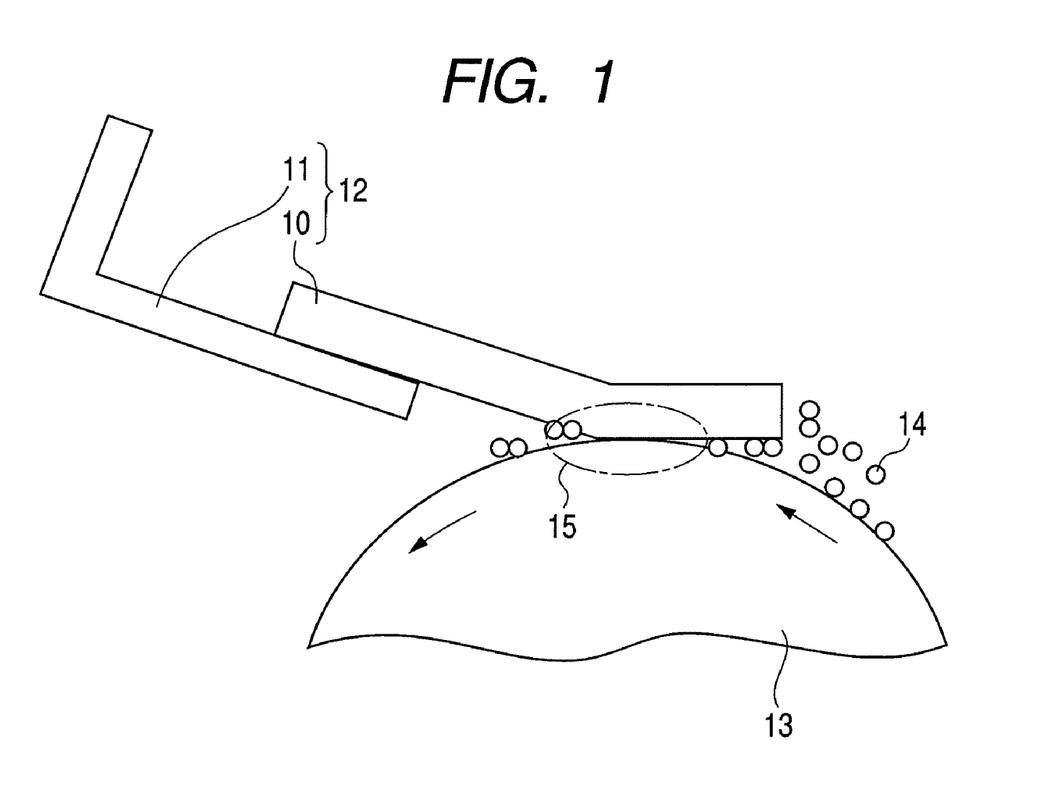
FIG. 1 is a schematic sectional view for describing a developer amount controlling blade.

FIG. 1 illustrates an example of a developer amount controlling blade according to the present invention, which has a blade member 10 abutting on a developer bearing member and a supporting member 11 to which the blade member is bonded. Here, an interface between the blade member 10 and the supporting member 11 is a surface at which the blade member 10 is bonded to the supporting member 11 (bonded surface), a slide part 15 is a face (sliding face) on which the developer bearing member slides, and is a face (charge-controlling surface) at which the charge of the developer is controlled. The developer amount controlling blade 12 produced by stacking such a blade member 10 and a supporting member 11 is fixed to a developer container (not shown). The developer amount controlling blade is pressed to the developer bearing member 13 at the slide part 15, and regulates an amount of developer particles passing through the slide part 15. The state is shown in FIG. 1.

Developer particles 14 are transported to the slide part 15 by the rotation movement of the developer bearing member 13 in a direction of an arrow. At this time, a surface (charge-controlling surface) of the developer amount controlling blade 12 for controlling an electric charge abuts on the developer bearing member 13, and accordingly can impart a predetermined amount of triboelectric charging to the developer particles and can regulate the amount of the developer particles which passes through the slide part 15 and are transported to a photosensitive member (not shown).

Figure 2:
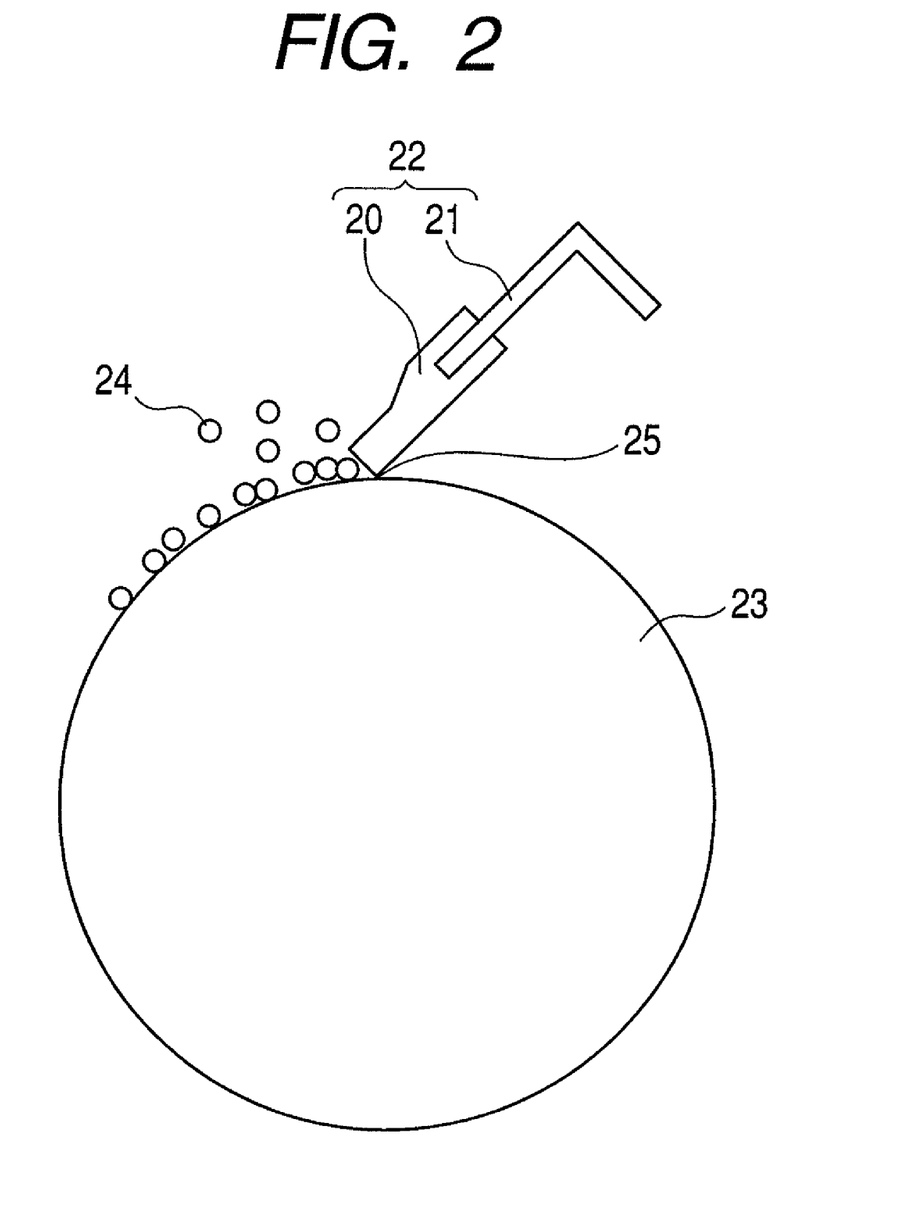
FIG. 2 is a schematic sectional view for describing a cleaning blade.

FIG. 2 illustrates an example of a cleaning blade including a blade member 20 abutting on the photosensitive member and a supporting member 21 to which the blade member is bonded. Here, an interface between the blade member 20 and the supporting member 21 is a face at which the blade member 20 is bonded to the supporting member 21 (bonded face), and an edge part 25 is a part of the cleaning blade, at which the cleaning blade abuts on the photosensitive member, and removes a remaining developer 24. Furthermore, the cleaning blade 22 made of such a blade member 20 and a supporting member 21 is fixed to a cleaning container (not shown), is pressed to the photosensitive member 23 at the edge part 25, and removes the developer with the abutting part 25. This state is shown in FIG. 2.

(Blade for Electrophotographic Apparatus)

A blade for an electrophotographic apparatus is an elastic blade used in the electrophotographic apparatus (image forming apparatus using electrophotographic process such as electrophotographic copier, laser beam printer and facsimile). These elastic blades are composed of a blade supporting member which generally has rigidity such as a steel plate, a blade member having rubber elasticity, and an adhesive layer.

A usable material for the supporting member can be appropriately selected from well-known materials for a supporting member of the blade for the electrophotographic apparatus, which include: a product worked out from an elastic metal plate such as a surface-treated steel sheet having a chromate conversion coating, a lubricant resin or the like coated thereon, phosphor bronze and spring steel; a molded product of a plastic, a ceramic or the like; and the like.

(Method for Manufacturing Blade for Electrophotographic Apparatus)

In a method for manufacturing a blade for an electrophotographic apparatus according to the present invention, a blade member can be molded with the use of a centrifuge molding method. However, the manufacturing method is not limited to the centrifuge molding method, but can employ an appropriate molding method such as a casting technique and a continuous injection technique. Here, the surface roughness of a part of a developer amount controlling blade at least abutting on a developer bearing member can be controlled by molding the blade member by using a mold of which the inner surface is roughened. In addition, surface properties of a part of a cleaning blade, which abuts on a photosensitive member, can be satisfied when the inner side of the mold (air side) is used.

A molding method for obtaining a sheet with a planar shape by pouring a thermosetting resin into the inside of the heated cylindrical mold which rotates at a high speed is referred to as the centrifuge molding method. The centrifuge molding method can easily produce a sheet having uniform thickness, and accordingly is widely used as a method for molding a thermosetting material. The centrifuge molding method can easily provide blade members having various dimensions by changing an amount of a charged material and a cutting dimension of an obtained sheet, and is suitable for a small-lot various-kinds production, so that the blade member can be manufactured with the centrifuge molding method.

(Formation of Holding Layer)

A holding layer is provided in between a cylinder die and a releasing layer, so as to smoothly remove the releasing layer from the cylinder die. When thin cylindrical sheets are repeatedly molded, the mold-releasability of the releasing layer is gradually lowered, so that it is necessary to remove the releasing layer from the cylinder die every some extent times of molding and form a new releasing layer. At this time, when a resin having low mechanical strength is used as the releasing layer, there is the case of needing an extremely long period of time and effort for completely removing the releasing layer from the cylinder die. Due to the holding layer provided in between the cylinder die and the releasing layer, the holding layer is comparatively easily removed together with the releasing layer from the cylinder die, because the holding layer is strongly bonded to the releasing layer.

The holding layer can be formed of a thermosetting resin having a curing temperature of a material to be centrifuge-molded (liquid elastomer raw material) or higher, and having a heat-resistant temperature generally of about 150° C. Particularly, a thermosetting resin showing no rubbery elasticity in a range of room temperature to 150° C. is advantageous when the holding layer is removed together with the releasing layer from the main body of the mold. Such a thermosetting resin includes, for instance, a polyimide resin, a polyurethane resin, a phenol resin and an epoxy resin. In particular, the epoxy resin can be used which can retain appropriate adhesiveness between itself and an inner periphery surface of the main body of the mold.

When the mold is repeatedly used for molding, the mold-releasability is lowered. Then, only the releasing layer may be additionally formed. When the total thickness of the holding layer and several layers of the releasing layer has reached such a thickness as to exert an influence on physical properties of the thin cylindrical sheet (molded body of elastomer), the holding layer may be removed together with the releasing layer from the cylinder die, and the holding layer and the releasing layer may be newly formed.

(Material which Forms Releasing Layer)

A releasing layer according to the present invention is formed of an addition two-component liquid silicone having a polysilazane-based or polysiloxane-based chain as a main chain. Thereby, the releasing layer can keep the mold-releasability for a long period of time without making the releasing agent migrate to a rubber layer, and without causing a problem of a deformation of a sheet (molded body of elastomer) and the like. The releasing layer on an inner wall surface of the mold is desired to show plane accuracy and can be easily removed after having been used. A condensation type silicone occasionally causes variation in a period of time necessary for completely being cured depending on the thickness of the releasing layer to be formed, so that an addition curing type is selected.

The addition curing type silicone is thermally cured at a very fast reaction speed, and occasionally is cured before being uniformly delivered to all areas on a wall surface of the mold to be provided with the releasing layer. In such a case, a reaction retarder may be timely added into the addition curing type silicone. The reaction retarder which can be used in the present invention can include, for instance, a control agent No. 6-10 (brand name of product made by Shin-Etsu Chemical Co., Ltd.).

A solid lubricant for forming a rough surface may be added in the releasing layer. The solid lubricant can include, for instance, carbon fluoride.

(Volatile Component in Releasing Layer)

A releasing layer contains 0.5% mass or less of a component which volatilizes at a curing temperature of a liquid elastomer raw material. When the content of the volatile component is 0.5% mass or less, the releasing layer can be prevented from being deformed by the volatilization of the volatile component due to a repeated molding operation. The releasing layer is consequently prevented from a defect that the molded body is torn or hardly demolded, because the releasing layer becomes difficult to maintain its mold-releasability.

A content of the component which is contained in the releasing layer and volatilizes at the curing temperature of the liquid elastomer raw material according to the present invention can be measured in the following way.

Prepare a mold, and pour liquid curing type silicone for forming the releasing layer into the mold. Prepare a test piece of the releasing layer by heating the mold at the same temperature and for the same period of time as the curing temperature and a period of time necessary for the liquid elastomer raw material to be completely cured and thereby curing the liquid curing-type silicone. Measure the mass of the test piece of the releasing layer and define the measured mass as an initial mass W1 of the test piece of the releasing layer. Next, charge the test piece of the releasing layer into an electric furnace of the same temperature as the curing temperature of the liquid elastomer raw material, and measure the change of the mass with time. Continue the heating until the mass of the test piece of the releasing layer stops decreasing, determine a period of time spent before the mass stops decreasing, and measure the mass of the test piece of the releasing layer at the time when the period of time elapsed. Define the mass measured at this time as a mass W2 of the test piece of the releasing layer in a state after a component to be volatilized at the curing temperature of the liquid elastomer raw material has been volatilized. Then, determine the content $\Delta W$ (% mass) of the component to volatilize at the curing temperature of the liquid elastomer raw material of the releasing layer from the following expression.

$$\Delta W(\text{mass }\%) = [(W1-W2)/W1] \times 100 \quad \text{Expression (1)}$$

(Silica in Releasing Layer)

A content of silica ($SiO_2$) in a releasing layer shall be 1% mass or less. The releasing layer can maintain its mold-releasability for a long period of time, by controlling the content of silica ($SiO_2$) which remains as a reactive group even after liquid silicone has been cured by a reaction to 1% mass or less.

(Rubber Hardness of Releasing Layer)

Furthermore, a releasing layer has a hardness of 50 degrees or more and 85 degrees or less by International Rubber Hardness Degree (IRHD). When the hardness is 50 degrees or more, the releasing layer can endure to repeated molding operations. When the hardness is 85 degrees or less, the releasing layer has controlled adhesiveness between the releasing layer and a molded blade member, and acquires adequate mold-releasability.

(Solid Lubricant in Releasing Layer)

A releasing layer further contains a solid lubricant having an average particle size of 2 μm or larger and 20 μm or smaller. The solid lubricant may be a powdery lubricant having heat resistance against approximately 150° C., and can adopt a silicone-based lubricant, a fluorine-based lubricant, molybdenum disulfide, graphite, graphite fluoride, boron nitride, tungsten disulfide or talc, for instance. In particular, graphite fluoride can be adopted because of having adequate various operationabilities.

When the average particle size of the solid lubricant is 20 μm or smaller, the releasing layer can inhibit a load length ratio of an obtained blade member from being small and can prevent an image evaluation from resulting in a streak failure. Furthermore, the releasing layer can prevent the thickness of the centrifuge-molded body to be obtained from being badly affected by the decrease of the smoothness on the inner periphery surface. On the other hand, when the average particle size is 2 μm or larger, the releasing layer can control the load length ratio of the obtained blade member so as not to become large, can control the obtained blade member so as not to hardly regulate an amount of a developer on a developer bearing member, and can form a uniformly thin layer of the developer. Accordingly, the effective particle size of the solid lubricant is 2 μm or larger and 20 μm or smaller, and particularly 10 μm or smaller.

(Viscosity of Releasing Layer)

Furthermore, the viscosity of silicone rubber can be 100 cps or higher and 10,000 cps or lower (0.1 Pa/s or more and 10 Pa/s or less). When the viscosity is 100 cps or higher, a curing reaction has adequate stability, and the releasing layer can stably obtain the objective hardness of silicone rubber. When the viscosity is 10,000 cps or lower, the viscosity is controlled so as not to become high; and the silicone rubber can be prevented from showing poor flowability in a centrifuge molding machine and can be prevented from badly affecting the thickness of a centrifuge-molded body, as a result.

(Liquid Elastomer Raw Material)

A liquid elastomer raw material to be used in the present invention may have superior abrasion resistance and mechanical properties, and can be a raw material containing a polyurethane resin as a main component. The above described polyurethane resin can be produced with a prepolymer method or a semi-one-shot method while using a polyisocyanate, a polyol, a chain extender and a catalyzer.

For instance, in the case of the prepolymer method, the liquid elastomer raw material can be obtained by preparing a prepolymer by using the polyisocyanate and the polyol, and adding the chain extender and the catalyzer into the prepolymer. The liquid elastomer raw material can be charged into a die for molding, and can be cured.

The polyisocyanate includes, for instance, 4,4'-diphenylmethane diisocyanate (MDI), 2,4-tolylene diisocyanate (2,4-TDI), 2,6-tolylene diisocyanate (2,6-TDI), xylene diisocyanate (XDI), 1,5-naphthylene diisocyanate (1,5-NDI), p-phenylene diisocyanate (PPDI), hexamethylene diisocyanate (HDI), isophorone diisocyanate (IPDI), 4,4'-dicyclohexylmethane diisocyanate (hydrogenated MDI), tetramethylxylene diisocyanate (TMXDI), carbodiimide-denaturated MDI and polymethylenephenyl polyisocyanate (PAPI). Among these compounds, MDI can be used.

The polyol includes polyester polyol, polyether polyol, caprolactone ester polyol, polycarbonate ester polyol or silicone polyol. A number average molecular weight can be 1,500 or more and 5,000 or less. This is specifically because when the number average molecular weight is 1,500 or more, an obtained urethane rubber can prevent the degradation of physical properties, and when the number average molecular weight is 5,000 or less, the prepolymer can prevent the increase of its viscosity and prevent the aggravation of its handleability.

A chain extender with a low molecular weight can be concomitantly used with the polyol. For instance, a glycol is used. Such a glycol includes ethylene glycol (EG), diethylene glycol (DEG), propylene glycol (PG), dipropylene glycol (DPG), 1,4-butanediol (1,4-BD), 1,6-hexanediol (1,6-HD), 1,4-cyclohexanediol, 1,4-cyclohexanedimethanol, xylylene glycol (telephthalyl alcohol) or triethylene glycol. In addition to the above described glycol, other polyhydric alcohols can be used. Such a polyhydric alcohol includes trimethylolpropane, glycerol, pentaerythritol and sorbitol. The polyhydric alcohol is used alone, or two or more polyhydric alcohols are used in combination.

A catalyzer generally used for curing polyurethane can be used as the catalyzer, which includes, for instance, a tertiary amine catalyzer.

(Manufacture of Blade for Electrophotographic Apparatus and Developer Amount Controlling Blade)

A blade member can be produced by using the above described mold and passing through the following steps, and consequently, a blade for an electrophotographic apparatus can be manufactured.

(1) A step of charging a raw material (liquid elastomer raw material) of the blade member into the above described mold; and (2) a step of curing the charged raw material in the mold to form a cured molding body.

When a developer amount controlling blade which is one of the blade for the electrophotographic apparatus is manufactured, the blade member can be molded by using the above described method for manufacturing the blade for the electrophotographic apparatus.

A development apparatus of an electrophotographic apparatus is provided with a roller-shaped developer bearing member which transports a developer to a developing part from a developer container. The development apparatus is also equipped with a developer amount controlling blade having a blade member to be pressed to the developer bearing member and a supporting member for supporting the blade member. The development apparatus controls the developer to a thin layer shape while triboelectrifying the developer in between the blade member and the developer bearing member, and supplying the thin-layer-shaped developer to an electrostatic latent image formed on a latent image bearing member (photosensitive member) to develop the latent image.

When a load length ratio of a part to be abutted at least on the developer bearing member of the blade member of the developer amount controlling blade is defined as Tp(C) (here, C is a cutting level (%)), Tp (50%) can be 30 or more and 90 or less. In addition, ten-point average roughness (Rz) of the part to be abutted at least on the developer bearing member of the developer amount controlling blade is 2 μm or larger and 25 μm or smaller.

(Load Length Ratio Tp (C))

A load length ratio means a ratio expressed by percentage of a length of a cut part of the surface formed when a standard length L extracted from the surface of a developer amount controlling blade is cut by a straight line that is parallel to an average line and is lower than the maximum peak by a cutting level C, with respect to the whole length L. In the present invention, the cutting level C is determined according to a percentage method of expressing the level assuming that the maximum peak is 0% and the minimum bottom is 100%.

When a load length ratio of a part of the developer amount controlling blade used in a state of abutting at least on the developer bearing member is represented by Tp(C) (C: a cutting level (%)), Tp can be 30 or more and 90 or less. When the load length ratio Tp (50%) is 30 or more, the developer amount controlling blade has a controlled amount of recesses thereon, can prevent the developer from entering into the recesses in large quantities and hardly leaving there, and can prevent the developer from forming an image streak due to fusing of the developer. When the load length ratio Tp (50%) is 90 or less, the developer amount controlling blade can prevent an effect of the roughened surface from being lost due to little unevenness formed thereon, and can prevent a uniform thin layer of the developer from being hardly formed on the developer bearing member. As a result, the developer amount controlling blade can impart a uniform charging to the developer, and can prevent the irregularity and ghost of an image from being produced.

(Rz of Blade Member)

Furthermore, a developer amount controlling blade according to the present invention can have a ten-point average roughness (Rz) of 2 μm or larger and 25 μm or smaller, at least at a part abutting on a developer bearing member. When the ten-point average roughness (Rz) is 2 μm or larger, the developer amount controlling blade can prevent developer particles from stopping rotation in between itself and the developer bearing member, and can prevent the developer from extremely increasing the force to be transported. Thus, the developer amount controlling blade can prevent a phenomenon that a sufficient amount of charge cannot be given to the developer because the developer does not form a thin layer on the developer bearing member. When the ten-point average roughness (Rz) is 25 μm or smaller, the developer amount controlling blade can prevent the developer particles from being sandwiched by a profile having large roughness, can give adequate charge by triboelectric charging to the developer particles, and can prevent an image malfunction due to the agglomeration of the developer.

(Phenomenon Relating to Mold-Releasability)

Figure 3:
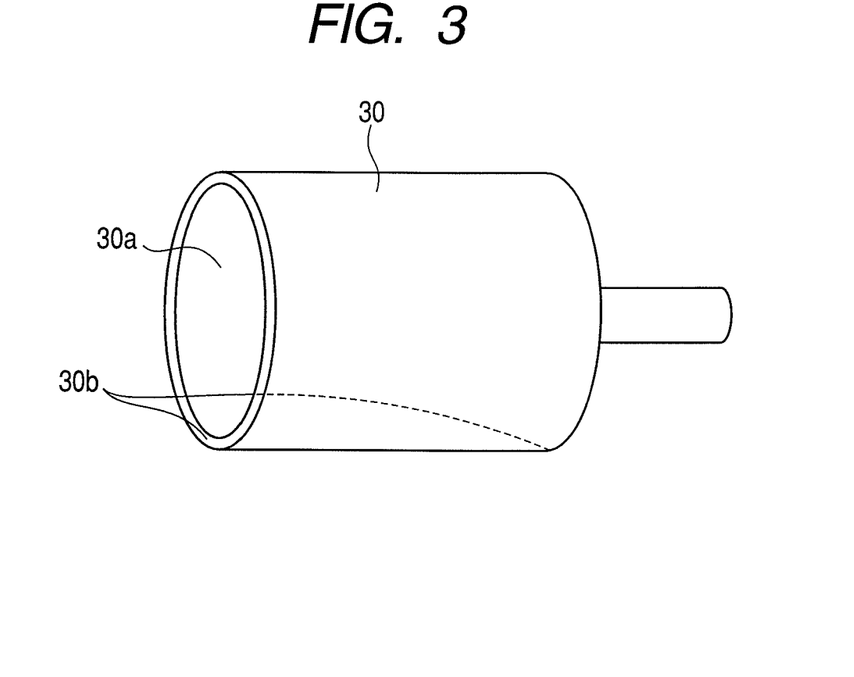
FIG. 3 is a schematic view illustrating one example of a mold according to the present invention.
Figure 4:
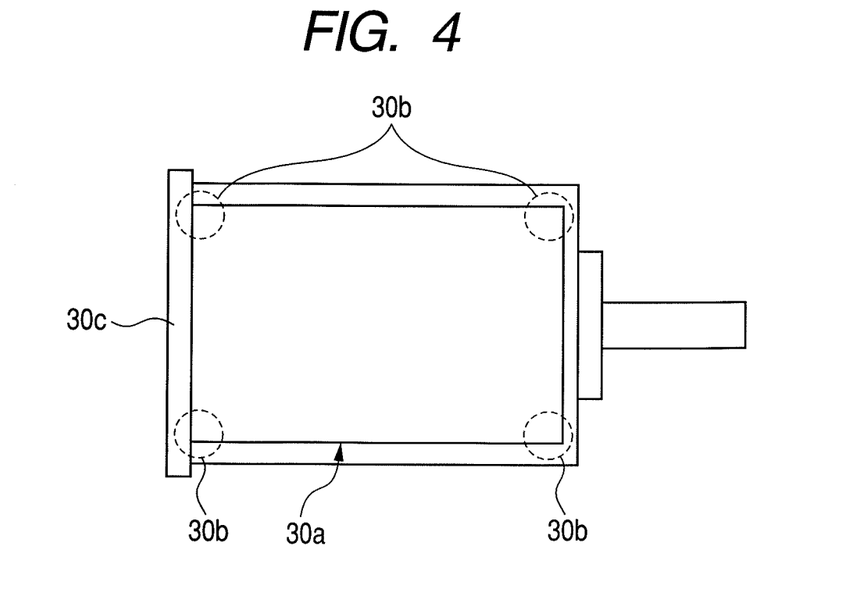
FIG. 4 is a schematic view illustrating a cross-section of one example of a mold according to the present invention.

FIG. 3 is a schematic view illustrating an overview of one example of a centrifuge molding. FIG. 4 is a schematic view of the cross-section. Here, FIG. 4 illustrates the state in which a cover 30c is attached to the centrifuge molding, and FIG. 3 illustrates the state in which the cover 30c is not attached. A centrifuge molding 30 has a tubular shape, and has a concave inner wall surface (may be referred to as inner periphery surface) 30a in an inner perimeter. A molded body of an elastomer is molded by charging a liquid elastomer raw material into the mold, and curing the liquid elastomer raw material by heating.

Figure 5:
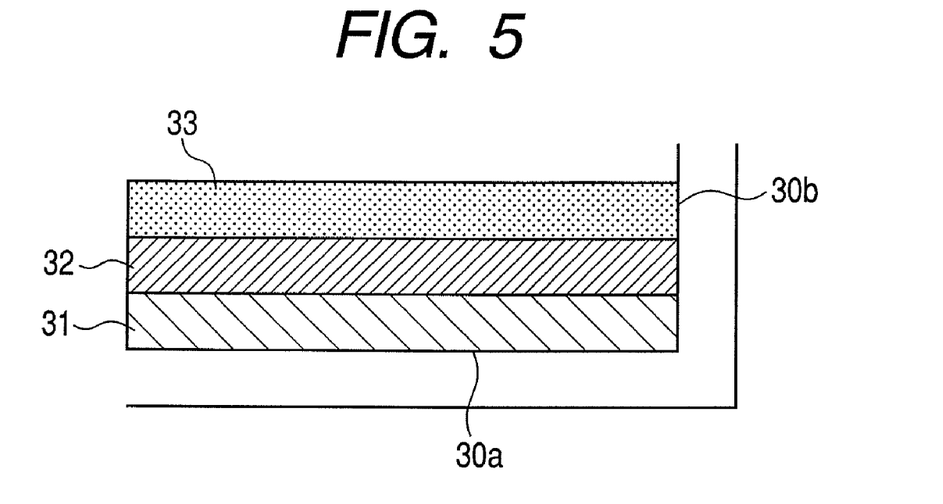
FIG. 5 is a schematic sectional view in the vicinity of an end part of an inner periphery surface in one example of a mold according to the present invention.

FIG. 5 illustrates a schematic view of a cross-section in the vicinity of an end part 30b of an inner periphery surface of a die when the molded body of the elastomer is molded with the use of a centrifuge molding. A wall surface in the end part of the inner periphery surface of the die includes an inner periphery surface 30a of the centrifuge molding 30 and an inner wall surface of the end part 30b of the inner periphery surface. In the inner periphery surface of the die, a peelable holding layer 31 and a releasing layer 32 are provided. Thereby, the centrifuge molding develops horizontal accuracy, peelability and adequate mold-releasability in production, and the molded body of the elastomer 33 is molded, released and produced therein.

Many of conventional releasing layers 32 formed on the holding layer 31 have a dimethyl polysiloxane structure as a main component. The dimethylpolysiloxane structure has generally such a molecular chain as is elongated due to polymerization, as is cross-linked due to polymerization, or as is modified with a functional group. It is known that both a reaction of growing a molecular chain of a macromolecule and a reaction of forming a cyclic body having a cyclic siloxane structure occur in a stage of forming the releasing layer with the use of a liquid curing-type silicone. It is conventional general characteristics of a curing reaction of the liquid curing-type silicone that a considerable amount of a volatile cyclic body component with a low molecular weight is incorporated in the releasing layer. This type of a volatile component with a low molecular weight results in remaining even in commercial liquid curing-type silicone.

The holding layer 31 is formed on the inner periphery surface 30a of the centrifuge molding 30, and the releasing layer 32 is formed on an inner periphery surface of the holding layer 31. After this, the liquid elastomer raw material is charged into the centrifuge molding and cured. Then, the releasing layer 32 is formed so as to spread to an inner wall surface of the end part 30b of the inner periphery surface, as is illustrated in FIG. 5. If the releasing layer 32 would thus spread to the inner wall surface of the end part 30b of the inner periphery surface, the molded body of the elastomer 33 can be formed without problems. When the liquid elastomer raw material is a thermosetting type, the centrifuge molding 30, the holding layer 31 and the releasing layer 32 are always exposed to a curing temperature of the liquid elastomer raw material during molding. In the case of the polyurethane-based liquid elastomer raw material, for instance, the curing temperature is usually in a range of 100 to 160° C. When the elastomer is repeatedly molded for a long period of time, the releasing layer 32 is also exposed to the temperature for the period of time.

Figure 6:
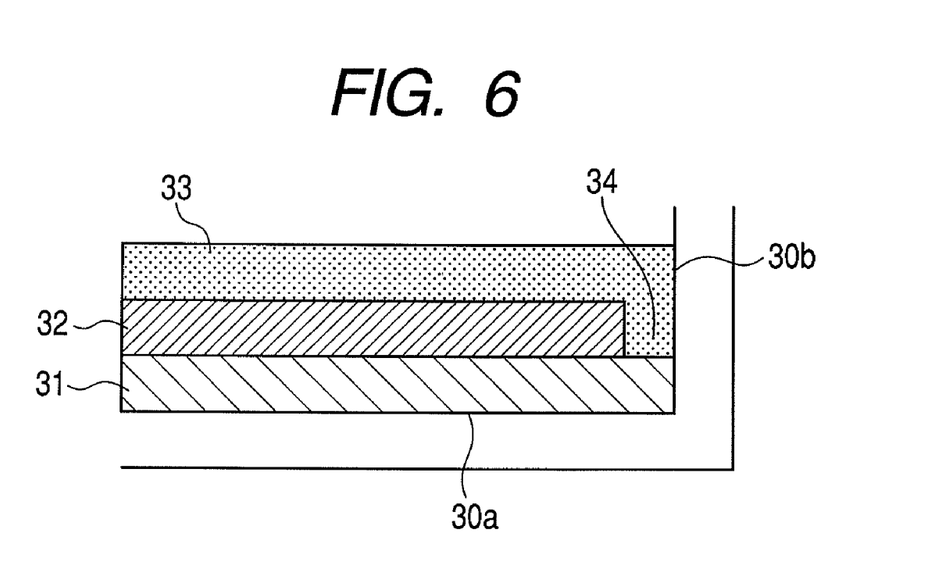
FIG. 6 is a schematic sectional view of one example of a mold in which a contraction gap is formed between a releasing layer and an end part of an inner periphery surface.

It is thought that when the releasing layer formed from the liquid curing-type silicone is exposed to a high temperature, a component with a large molecular weight volatilizes as well as a component with low molecular weight (mainly cyclic siloxane component of trimer to decamer which are referred to as D3 to D10). These volatile components do not immediately volatilize but gradually volatilize for a few days, and decrease the mass of the releasing layer at the same time. Even though the releasing layer 32 is formed from two-component curing-type silicone, for example, when being exposed to the curing temperature of the liquid elastomer raw material for a long period of time, the releasing layer 32 gradually decreases its mass. The releasing layer which has caused a mass reduction causes dimension contraction at the same time. Accordingly, when the releasing layer 32 formed from the two-component curing-type silicone contains a large amount of a component which volatilizes at the curing temperature of the liquid elastomer raw material, it is assumed that the releasing layer 32 also causes a large dimension contraction. Then, even if the releasing layer 32 fills the space reaching the end part 30b of the inner periphery surface at the initial time as is illustrated in FIG. 5, when the releasing layer 32 is exposed to the curing temperature for a long period of time, a low molecular weight component volatilizes to cause the mass reduction. It became clear as an observation fact that the releasing layer 32 causes the dimension contraction simultaneously with the mass reduction, and consequently forms a contraction gap 34 though being small in between the releasing layer 32 and the end part 30b of the inner periphery surface of the mold, as is illustrated in FIG. 6.

When the liquid elastomer raw material is molded in the mold in such a state, the liquid elastomer raw material is charged into a contracted gap in the vicinity of the end part 30b of the inner periphery surface of the mold and cured to form a burr. For this reason, the end part 30b of the inner periphery surface of the mold starts the aggravation of mold-releasability, causes the aggravation of mold-releasability and workability when an elastomer has been continuously molded for a long period of time, and causes a molding failure.

In order to make the mold show the adequate workability and productivity for a long period of time without causing such problems, it is expected that the mold can continue a state as illustrated in FIG. 5 even though having been exposed to the curing temperature of the liquid elastomer raw material for a long period of time. In other words, it is ideal that the releasing layer does not cause the shrinkage as illustrated in FIG. 6, even if having been exposed to the curing temperature of the liquid elastomer raw material for a long period of time, and it can be understood that the less component with a volatile low molecular weight is contained, the more advantages for workability has the releasing layer.

However, it is concerned that when the mold is provided with the releasing layer therein which has been formed with the use of a liquid curing-type silicone that generally contains a component with a low molecular weight and is used for molding, even a component of such a molecular weight as not to volatilize at room temperature volatilizes, and causes a mass reduction and shrinkage.

Then, as a result of having made an extensive investigation, the present inventors found out that when the releasing layer formed with the use of the liquid curing-type silicone satisfies the above described following requirements (a) to (e), the releasing layer can reliably keep adequate mold-releasability for a long period of time, and accomplished the present invention.

As described above, according to the present invention, an elastomer is easily peeled from the mold with the use of a simple unit, and can be efficiently demolded to decrease malfunctions such as tearing when the molded body is demolded. In addition, the mold can be repeatedly used for a long period of time, and can provide stable productivity. Furthermore, the mold can produce a uniform elastomer with a high accuracy of a dimension, and shows advantages particularly when manufacturing blade members such as a cleaning blade for an electrophotographic apparatus and a developer amount controlling blade. The mold according to the present invention is not only applied to a centrifuge molding and a cast molding, but also can be applied to other molding methods. Furthermore, the blade member for the electrophotographic apparatus produced in the mold of the present invention can be used for the cleaning blade for the electrophotographic apparatus and the developer amount controlling blade.

When the blade is used as a blade member of the cleaning blade, the blade plays a role of scraping and cleaning a remaining developer which has not been transferred on a photosensitive member. Along with a recent progress of an electrophotographic technology, the developer becomes as fine as about 5 μm, and besides, a particle size developer is also developed, so that the cleaning blade is required to have a very high accuracy of a thickness dimension for efficiently cleaning the developer. In addition, the unevenness of the surface is important to such a cleaning blade, so that the cleaning blade is required to have surface properties with higher accuracy. By using the mold of the present invention, such a blade member for an electrophotographic apparatus can be manufactured as to have an accuracy of a dimension and an accuracy of the surface which are required to a blade member of such a cleaning blade.

On the other hand, when the blade is used as the blade member of the developer amount controlling blade, high characteristics are required to the accuracy of the dimension so as to perform the role. The developer amount controlling blade is a function member which abuts on a developer bearing member to form a fine developer layer, so that the thickness decides an abutting pressure of the developer amount controlling blade onto the developer bearing member, and becomes an important factor for forming an adequate image and stabilizing image formation. In addition, the surface properties are an important factor for an electric charge which is given to the developer, so that the developer amount controlling blade is required to have controlled surface properties. By using the mold of the present invention, such a blade member for an electrophotographic apparatus can be manufactured as to have an accuracy of a dimension and surface properties which are required to a blade member of such a developer amount controlling blade.

EXEMPLARY EMBODIMENT

Exemplary embodiments will now be described below together with comparative examples, but the present invention is not limited to these exemplary embodiments.

A developer amount controlling blade was produced in the following way by using a centrifuge molding machine provided with a cylindrical die.

An electrogalvanizing steel plate (brand name: ZINKOTE 21 made by NIPPON STEEL CORPORATION) having a chromium-free surface treatment layer containing a urethane-modified olefin resin and an acryl-modified olefin resin was used as a supporting member. A film-shaped hot melt adhesive (brand name: Elphan UH made by Nihon Matai Co., Ltd.) was temporally bonded thereto.

Subsequently, 100 parts by mass of adipate-based urethane prepolymer (with number average molecular weight of 2,000, containing 6.25 mass % NCO), 3.7 parts by mass of 1,4-butanediol and 1.9 parts by mass of trimethylolpropane were mixed and stirred in a mixing chamber of a casting machine. The obtained liquid elastomer raw material was charged into the centrifuge molding machine, and was molded. The liquid elastomer raw material was molded by charging the liquid elastomer raw material into a cylindrical die kept at the temperature of 130° C., and heating the raw material for 50 minutes to cure the raw material. After that, the molded body was demolded and a polyurethane sheet with the thickness of 1 mm was obtained. The demolded sheet-shaped polyurethane elastomer was cut into a predetermined dimension and was used as a blade member.

The blade member was bonded by heat with a supporting plate to which the above described hot melt adhesive had been temporally bonded, and the developer amount controlling blade was obtained.

The above described centrifuge molding machine had a cylindrical die of which the swinging range is 0.06 mm at normal temperature, and a releasing layer was previously formed in the inner periphery surface of the die in the following way. At first, the die was heated to a predetermined temperature, and a predetermined amount of a material for forming a releasing layer (two-component mixing-type silicone rubber) was supplied while the die is rotated, and was delivered to all regions on the inner periphery surface. After that, predetermined amounts of carbon fluoride of a solid lubricant, the above described two-component mixing-type silicone rubber and a hydrocarbon-based solvent of a solvent were applied onto the above material with a spray method, and were cured by heat to form a releasing layer having the thickness of 1 mm and a roughened-surface. As described above, a blade member having a roughened-surface was obtained by charging a polyurethane elastomer onto the layer, and molding the polyurethane elastomer by heat to transfer the previously-formed roughened surface to the polyurethane elastomer.

(Measurement for Content of Volatile Component in Releasing Layer)

A content of a component which was contained in a releasing layer that was formed with the use of liquid curing-type silicone and volatilized at a curing temperature of a liquid elastomer raw material was measured in the following way.

A die having a dimension of 50 mm×80 mm×5 mm was prepared. A test piece of a releasing layer was prepared by pouring a liquid curing-type silicone for forming the releasing layer into the mold, and heating and curing the liquid curing-type silicone at 130° C. which was the curing temperature of the liquid elastomer raw material that was used in the exemplary embodiment, for 1 hour. After the temperature was lowered to room temperature, the mass of the test piece of the releasing layer was measured. The measured mass was represented by an initial mass W1 of the test piece of the releasing layer. Next, the test piece of the releasing layer was charged into an electric furnace set at 130° C. which was the curing temperature of the liquid elastomer raw material that was used in the exemplary embodiment, and the change of the mass with time was measured. It was found that the test piece of the releasing layer stopped the decrease of the mass after about 10 days. Accordingly the mass of the test piece of the releasing layer after having been heated at 130° C. for 10 days was defined as mass W2 of the test piece of the releasing layer in a state after a component to be volatilized at the curing temperature of the liquid elastomer raw material which was used in the exemplary embodiment has been volatilized. Then, the content $\Delta W$ (mass %) of the component to be volatilized at the curing temperature of the liquid elastomer raw material of the releasing layer which was formed with the use of liquid curing-type silicone was determined by the following expression.

$$\Delta W(\text{mass \%}) = [(W1 - W2)/W1] \times 100 \qquad \text{Expression (2)}$$

(Method of Evaluating Hardness of Releasing Layer)

International Rubber Hardness Degree (IRHD) on a releasing layer was measured by using Wallace Micro Hardness Tester made by Wallace Instruments (H. W. WALLACE), on the basis of JIS K 6253.

(Method of Evaluating Load Length Ratio)

A load length ratio TP (50%) of a charge-controlling surface of a blade member was measured with the use of Ultra-deep laser microscope VK-8510 (brand name of product made by KEYENCE CORPORATION), on the basis of JIS B 0601.

(Method of Evaluating Roughness)

The ten-point average roughness (Rz) of a charge-controlling surface of a blade member was measured with the use of surface roughness measuring instrument SE 3500 (brand name of product made by Kosaka Laboratory Ltd.), on the basis of JIS B 0601.

(Method of Measuring Average Particle Size of Solid Lubricant)

An average particle size of a solid lubricant was measured by using an ultracentrifugal-type automatic particle size distribution analyzer: CAPA-700 (brand name of product made by HORIBA, Ltd.), an aqueous solution of a surface active agent as a dispersion medium and an ultrasonic wave dispersion method as a dispersion condition.

(Method of Measuring Viscosity)

The viscosity of silicone rubber which was used for forming a releasing layer was measured with the use of an SV type viscometer: SV-10 (brand name of product made by A&D Company, Ltd). The Silicone rubber which was used for the releasing layer was previously heated to 130° C., and the viscosity was measured at 130° C.

(Evaluation of Peelability)

Continuous productivity was evaluated through an operation of repeatedly charging, curing and demolding the above described liquid elastomer raw material. The easiness of the peelability of an obtained molded body of a polyurethane elastomer having a thin film cylinder shape at the time when the molded body was demolded from a centrifuge molding was evaluated by the number of occurrences of the malfunction according to the following standards 1 to 4, which was caused by a lack of a peeling force of the molded body that was to be demolded. An evaluation criterion was determined by the number of malfunctions occurring in 100 times of repeated operations of molding the molded body.
1. The molded body is torn, and the end remains in the mold.
2. When the molded body is taken out, a force is applied to the molded body and deforms a shape of the molded body.
3. The end of the molded body is anchored into the mold, and a tear forms.
4. The molded body is not demolded completely.
A: 2 or less
B: 5 or less
C: 5 or more Exemplary Embodiment 1

A main agent and a curing agent of two-component addition-curing type silicone rubber (brand name: XE15-C3074 made by GE Toshiba silicone Co., Ltd.) were mixed in a mass ratio of main agent:curing agent=10:1, and the mixture was stirred and used as a silicone rubber. A material for forming a releasing layer was prepared by adding a component of a low molecular weight (mainly a cyclic siloxane component of trimer to decamer referred to as D3 to D10) to the silicone rubber while adjusting a content of a volatile component so as to occupy 0.5% mass of the whole releasing layer. The releasing layer was prepared by charging the material for forming the releasing layer into a centrifuge molding machine, and curing the material at the curing temperature of 140° C. Furthermore the surface of the releasing layer was roughened by uniformly spraying a mixture of carbon fluoride having the average particle size of 5 μm, the above described silicone rubber and a solvent uniformly mixed in a mass ratio of 1:1:4 at an air pressure of 0.3M Pa for 30 seconds. Here, CMC (brand name of product made by Central Glass Co., LTD.) was used as carbon fluoride, and Actrel (brand name of product made by Exxon Mobil Corporation.) was used as a solvent.

A sheet-shaped molded body of an elastomer was obtained as described above, by using the mold in which the releasing layer is formed in the above way; a blade member was obtained by cutting the sheet-shaped molded body of the elastomer; and a developer amount controlling blade was manufactured by using the blade member.

Table 1 shows a type (addition type or condensation type) and viscosity of silicone rubber which was used for forming the releasing layer, a temperature at which the material for forming the releasing layer was cured, a content of a volatile component and silica in the releasing layer and the International Rubber Hardness Degree of the releasing layer. Table 1 also shows an average particle size of a solid lubricant (carbon fluoride) which was used for roughening the releasing layer, an evaluation result for peelability, a load length ratio Tp (50%), and ten-point average roughness (Rz) as well.

Exemplary Embodiment 2

Silica ($SiO_2$) was added to a material for forming a releasing layer so that silica occupied 1% mass of the whole releasing layer.

The releasing layer was formed, a developer amount controlling blade was produced, and various items were evaluated in a similar way to that in Exemplary embodiment 1 except the above described operation. Physical properties of used materials and the evaluation result are shown in Table 1 similarly to those in Exemplary embodiment 1.

Exemplary Embodiment 3

A temperature for making a material for forming a releasing layer cured (temperature at which releasing layer is cured) was set at 100° C.

The releasing layer was formed, a developer amount controlling blade was produced, and various items were evaluated in a similar way to that in Exemplary embodiment 1 except the above described operation. Physical properties of used materials and the evaluation result are shown in Table 1 similarly to those in Exemplary embodiment 1.

Exemplary Embodiment 4

Carbon fluoride having the average particle size of 2 μm was used as a solid lubricant for roughening a releasing layer.

The releasing layer was formed, a developer amount controlling blade was produced, and various items were evaluated in a similar way to that in Exemplary embodiment 1 except the above described operation. Physical properties of used materials and the evaluation result are shown in Table 1 similarly to those in Exemplary embodiment 1.

Exemplary Embodiment 5

Carbon fluoride having an average particle size of 20 μm was used as a solid lubricant for roughening a releasing layer.

The releasing layer was formed, a developer amount controlling blade was produced, and various items were evaluated in a similar way to that in Exemplary embodiment 1 except the above described operation. Physical properties of used materials and the evaluation result are shown in Table 1 similarly to those in Exemplary embodiment 1.

Exemplary Embodiment 6

A temperature for making a material for forming a releasing layer cured (temperature at which releasing layer is cured) was set at 130° C. The releasing layer was formed, a developer amount controlling blade was produced, and various items were evaluated in a similar way to that in Exemplary embodiment 1 except the above described operation. Physical properties of used materials and the evaluation result are shown in Table 1 similarly to those in Exemplary embodiment 1.

Comparative Example 1

A main agent and a curing agent of two-component condensation-curing type silicone rubber (brand name: CY52 made by Dow Corning Toray Co., Ltd.) were mixed in a ratio of main agent:curing agent=10:1, and the mixture was stirred and used as a silicone rubber.

A releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

Comparative Example 2

A material for forming a releasing layer was prepared by adding a component of a low molecular weight (mainly a cyclic siloxane component of trimer to decamer referred to as D3 to D10) to the silicone rubber which was used in Exemplary embodiment 1, while adjusting a content of a volatile component so as to occupy 0.6 mass % of the whole releasing layer.

The releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

Comparative Example 3

Silica ($SiO_2$) was added to a material for forming a releasing layer so that silica occupied 1.5% mass of the whole releasing layer.

The releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

Comparative Example 4

A temperature for making a material for forming a releasing layer cured (temperature at which releasing layer is cured) was set at 80° C.

The releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

Comparative Example 5

A temperature for making a material for forming a releasing layer cured (temperature at which releasing layer is cured) was set at 150° C.

The releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

Comparative Example 6

Carbon fluoride having the average particle size of 1 µm was used as a solid lubricant for roughening a releasing layer.

The releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

Comparative Example 7

Carbon fluoride having the average particle size of 25 µm was used as a solid lubricant for roughening a releasing layer.

The releasing layer was formed, a developer amount controlling blade was produced, and various items were evaluated in a similar way to that in Exemplary embodiment 1 except the above described operation. Physical properties of used materials and the evaluation result are shown in Table 2 similarly to those in Exemplary embodiment 1.

TABLE 1

|  |  | Exemplary embodiment 1 | Exemplary embodiment 2 | Exemplary embodiment 3 | Exemplary embodiment 4 | Exemplary embodiment 5 | Exemplary embodiment 6 |
| --- | --- | --- | --- | --- | --- | --- | --- |
| Addition type/condensation type |  | Addition type | Addition type | Addition type | Addition type | Addition type | Addition type |
| Viscosity | cps | 11000 | 11000 | 11000 | 11000 | 11000 | 11000 |
|  | (Pa · s) | (11.0) | (11.0) | (11.0) | (11.0) | (11.0) | (11.0) |
| Temperature for curing releasing layer | ° C. | 140 | 140 | 100 | 140 | 140 | 130 |
| Content of volatile component | mass % | 0.5 | 0.5 | 0.5 | 0.5 | 0.5 | 0.5 |
| Amount of silica | mass % | 0 | 1 | 0 | 0 | 0 | 0 |
| International Rubber Hardness Degree (IRHD) | ° | 85 | 85 | 50 | 85 | 85 | 65 |
| Average particle size of solid lubricant | µm | 5 | 5 | 5 | 2 | 20 | 5 |
| Evaluation of peelability |  | B | B | B | B | B | A |
| Load length ratio Tp (50%) | % | 65 | 65 | 65 | 80 | 30 | 65 |
| Rz | µm | 6 | 6 | 6 | 2 | 25 | 6 |

TABLE 2

|  |  | Comparative example 1 | Comparative example 2 | Comparative example 3 | Comparative example 4 | Comparative example 5 | Comparative example 6 | Comparative example 7 |
| --- | --- | --- | --- | --- | --- | --- | --- | --- |
| Addition type/condensation type |  | Condensation type | Addition type | Addition type | Addition type | Addition type | Addition type | Addition type |
| Viscosity | cps | 8000 | 11000 | 11000 | 11000 | 11000 | 11000 | 11000 |
|  | (Pa · s) | (8.0) | (11.0) | (11.0) | (11.0) | (11.0) | (11.0) | (11.0) |

TABLE 2-continued

| | | Comparative example 1 | Comparative example 2 | Comparative example 3 | Comparative example 4 | Comparative example 5 | Comparative example 6 | Comparative example 7 |
|---|---|---|---|---|---|---|---|---|
| Temperature for curing releasing layer | ° C. | 140 | 140 | 140 | 80 | 150 | 140 | 140 |
| Content of volatile component | mass % | 0.5 | 0.6 | 0.5 | 0.5 | 0.5 | 0.5 | 0.5 |
| Amount of silica | mass % | 0 | 0 | 1.5 | 0 | 0 | 0 | 0 |
| International Rubber Hardness Degree (IRHD) | ° | 85 | 85 | 85 | 40 | 90 | 85 | 85 |
| Average particle size of solid lubricant | μm | 5 | 5 | 5 | 5 | 5 | 1 | 25 |
| Evaluation of peelability | | C | C | C | C | C | C | C |
| Load length ratio Tp (50%) | % | 65 | 65 | 65 | 65 | 65 | 95 | 20 |
| Rz | μm | 6 | 6 | 6 | 6 | 6 | 1 | 35 |

As is understood from a result of the above described Table 1, any mold in exemplary embodiments showed a reduced frequency of occurrences of tears and malfunctions in demolding after 100 times of molding operations, and could satisfactorily maintain its mold-releasability for a long period of time. On the contrary, molds in comparative examples in the above described Table 2 showed occurrences of tears and malfunctions in demolding frequently, and could not maintain its mold-releasability for a long period of time.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-179637, filed Jul. 9, 2007 which is hereby incorporated by reference herein in its entirety.

What is claimed is:

1. A mold which has a holding layer foamed on an inner periphery surface of a main body of a die and a releasing layer formed on an inner periphery surface of the holding layer, and is used to produce a molded body made of an elastomer, the molded body being produced by charging a liquid elastomer raw material into the inside of the mold and curing the liquid elastomer raw material, wherein
   (a) the releasing layer is formed of an addition two-component liquid silicone having a polysilazane-based or polysiloxane-based chain as a main chain;
   (b) the releasing layer contains: (i) a component which volatilizes at a curing temperature of a liquid elastomer raw material, and (ii) silica ($SiO_2$);
   (c) the releasing layer contains 0.5% mass or less of the component which volatilizes at a curing temperature of the liquid elastomer raw material; and
   (d) the releasing layer contains 1% mass or less of the silica.

2. The mold according to claim 1, wherein the mold is a centrifuge mold.

3. The mold according to claim 1, wherein the mold is a casting mold.

4. The mold according to claim 1, wherein the addition two-component liquid silicone has a viscosity of 0.1 Pa·s or higher and 10 Pa·s or lower.

5. The mold according to claim 1, wherein the liquid elastomer raw material contains a polyurethane resin as a main component.

6. A method for manufacturing a blade for an electrophotographic apparatus, which comprises a blade member and a supporting member for supporting the blade member, wherein the blade member is manufactured through the steps of:
   (1) charging a liquid elastomer raw material into the mold according to claim 1; and
   (2) curing the liquid elastomer raw material in the mold to form a cured, molded body.

7. A method for manufacturing a blade for an electrophotographic apparatus, including a developer bearing member, the blade member comprising a blade member and a supporting member for supporting the blade member, wherein the blade member is manufactured through the steps of:
   (1) charging a liquid elastomer raw material into the mold according to claim 1; and
   (2) curing the liquid elastomer raw material in the mold to form a cured, molded body,
   wherein the blade member has a load length ratio Tp(C) (where C is a cutting level (%)), at least at a part of the blade member to be abutted by the developer bearing member, and Tp (50%) is 30 or more and 90 or less, and
   wherein the part of the blade member to be abutted by the developer bearing member has a ten-point average roughness (Rz) of 2 μm or more and 25 μm or less.

* * * * *